June 20, 1933.  H. PAHL  1,914,455
RUBBER HOSE
Filed June 5, 1930
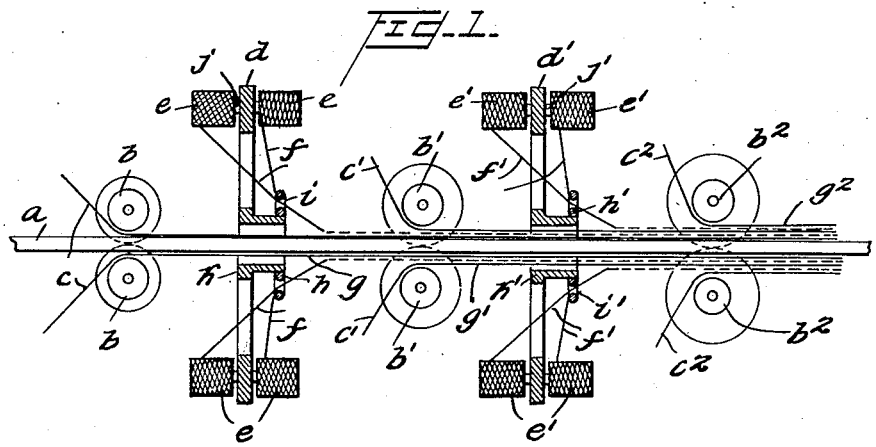
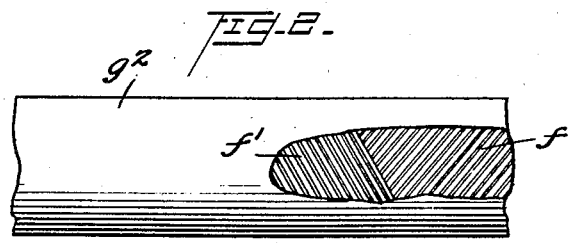
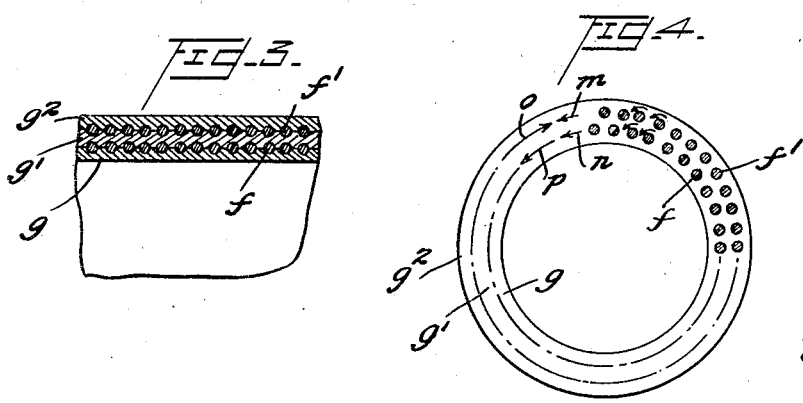
Inventor
Heinrich Pahl,
By Watson, Coit, Morse & Grindle
Attorneys Patented June 20, 1933

1,914,455

UNITED STATES PATENT OFFICE

HEINRICH PAHL, OF DUSSELDORF-RATH, GERMANY

RUBBER HOSE

Application filed June 5, 1930. Serial No. 459,391.

My invention relates to improvements in rubber hose, and in apparatus for manufacturing the same, this application being a continuation in part of my prior application filed February 12, 1929, Serial No. 339,442 and since issued as Patent Number 1,878,885, of September 20, 1932. More particularly my invention relates to the manufacture of rubber hose reinforced by threads or strands, preferably of fibrous material, and the object of the improvements is to provide a rubber hose in which the threads or strands are not subject to wear by rubbing on each other. With this object in view, the invention consists in disposing the threads or strands within the body of rubber so that the adjacent threads or strands or portions thereof are out of contact with each other. In the following description reference will be made to threads or strands, but this expression is understood to include cord fabric such as is commonly used in the manufacture of tires, and other similar fabric in which the principal or heavier strands extend in one direction and are maintained in proper spaced relation by relatively light transversely extending strands.

In carrying out the invention, the threads or strands are spirally disposed within the body of rubber, the helically arranged threads being disposed in one or more turns, the pitch of the turns depending on the number thereof. Further, the invention includes rubber tubes in which several layers of reinforcing strands or threads are disposed one about the other. The number of the turns of each layer is, of course, dependent on the pitch, the diameter of the tube, the thickness of the threads or strands, and the spacing of the threads. The spacing between the individual threads or the portions thereof should ordinarily be smaller than the diameter of the threads, in order that a large number of threads may be provided in each layer. But each thread or strand should be separated from the adjacent thread or strand by a wall or rib of rubber, so that the threads or strands do not rub on each other when the tube is bent or expanded in order to prolong the life of the tube.

By completely embedding the individual threads or strands in the body of rubber, they are intimately bound to the rubber. In view of the large number of threads and the flat distribution thereof within the body of rubber, the thickness of the tube can be comparatively small. Further, the tubes can be manufactured by simple methods and within a short period of time so that the cost of production is materially reduced.

In order that the invention be clearly understood, one form of apparatus suitable for manufacturing the rubber tube as well as the tube made by such apparatus have been illustrated in the accompanying drawing, in which:

Figure 1 is a somewhat diagrammatic sectional elevational view of the apparatus;

Figure 2 is a plan view of a tube in which successive layers are broken away;

Figure 3 is a partial longitudinal sectional view illustrating the manner in which the threads or strands are spaced; and Figure 4 is a diagrammatic transverse sectional view illustrating the action of certain forces tending to disrupt the tube.

In the example shown in Figure 1, the apparatus consists of pairs of grooved rolls $b$, $b$, $b'$, $b'$, and $b^2$, $b^2$, and a mandrel $a$ disposed between the rolls of the pairs, the said rolls being adapted to bend strips $c$, $c'$, and $c^2$ of rubber into tubular form and to combine the same at their seams by the application of pressure. Between the pairs of rollers there are rotary rings $d$, $d'$, the tubular hubs $k$, $k'$ of which carry flanges $h$, $h'$ formed with bores $i$, $i$. The rings $d$, $d'$ carry spindles $j$, $j'$ adapted to have spools $e$, $e'$ of threads or strands rotatably mounted thereon, the threads $f$, $f'$ being passed through the holes $i$, $i'$ of the flanges $h$, $h'$.

In the practice of the invention, two strips $c$ of rubber are passed between the first pair of rollers $b$ and bent on the mandrel into tubular form, the rubber tube thus formed being passed through the tubular hub $k$ of the first ring $d$. At the rear of the said hub, the threads $f$ are wound on the rubber tube thus formed by rotating the ring $d$ and the spools $e$ carried thereby. The number of the spools $e$ corresponds to the number of the turns to be applied to the inner tube $g$, and it will be appreciated that while only four spools may be seen in Figure 1 which is a sectional view, it is preferable to wind on a substantial number of threads, for instance, as many as thirty to fifty threads in each layer. Suitable means are provided for braking the spools $e$, so that the threads $f$ are applied to the rubber tube under tension. Thus the threads partly press themselves into the tube $g$, as is clearly shown in Figure 2, to fix the threads in their proper relative position during the process of manufacture.

After the first layer of threads has thus been applied to the tube $g$, the rollers $b'$, $b'$ apply thereto a second layer of rubber by forming the strips $c'$, $c'$ into a tube $c$ and pressing the same on the threads or strands $f$ and the inner tube $g$. Thereby the projecting portions of the threads $f$ are embedded within the tube $g'$.

The tube $g$, $g'$ is now passed through the tubular hub $i'$ of the second ring, and by rotating the said ring $d'$, another layer of threads or strands $f'$ is helically wound on the tube $g$, $g'$. Preferably, the rings $d$ and $d'$ are rotated in opposite directions, so that the threads of the successive layers are wound in the opposite sense.

The tube $g$, $g'$, having the outer layer $f'$ partly embedded therein, is now passed between the pairs of rollers $b^2$, where a third layer of rubber $g^2$ is applied thereto by bending the strips $c^2$ into tubular form.

It will be understood that the second and third layers of rubber are pressed on the inner layers, and the layers of rubber are of sufficient thickness so that the projecting portions of the threads or strands are completely embedded therein.

If desired, further layers of strands and rubber may be applied to the tube according to the desired thickness of the tube.

By varying the velocity of the feed of the rubber tubes or the velocity of the rotation of the rings $d$, $d'$, the pitch of the helically wound threads can be varied.

In any event, it is desirable to apply sufficient pressure to force the rubber into the interstices between the threads. In some cases I provide a plurality of pairs of rollers and several layers of rubber for the purpose of building up the hose to the requisite thickness. Preferably the rollers in the successive pairs are so placed that the seams are circumferentially displaced with relation to each other and in order to ensure uniform thickness of the rubber. It will also be appreciated that the separation of the threads or strands may be effected by coating the individual strands with a solution of rubber or latex prior to winding the strands. Various other methods of applying the rubber to the strands may be resorted to, the pressure rollers described herein comprising only one of a number of forms of apparatus suitable for the purpose.

As mentioned hereinbefore, the threads or strands are preferably of fibrous material, and such threads are usually formed by twisting a plurality of separate fibers together so that, when tension is applied to the thread, it tends to unravel by twisting in the opposite direction. This is also true of the usual cord fabric hereinbefore mentioned in which the principal strands extend in one direction. In any single thread, the couple thus resulting from the application of tension thereto is small, but when a large number of threads are wound helically on a somewhat elastic tube, as in the present instance, the total effect is appreciable, and there is a tendency to distort or twist the entire tube in the direction in which the thread must be twisted to unravel the same. There is a further and separate force acting which tends to twist the tube by reason of the fact that the threads are wound helically, since the application of tension to any helix tends to unwind the same. The direction of this force is of course dependent on the direction of the helix, whereas, the direction of the force which applies torque to the tube as the result of the twisting of the strands in making the individual thread is always in the same direction provided the same thread is used in each layer. It will thus be observed that, if successive layers of thread are wound helically in opposite directions, that is to say, if the helices in the successive layers are of opposite hand, the force acting on the tube resulting from the helical winding of the thread will in one layer be in the same direction as the force resulting from the twisting of the individual strands and in the succeeding layer will be in the opposite direction from the force exerted by reason of the twisting of the individual strands. It will thus be seen that the force resulting from the helical winding should be greater in that layer in which that force is opposed by the force resulting from the twisting of the thread in order to overcome the torque produced in the adjacent layer in which the force resulting from the helical winding acts in the same direction as the force resulting from the twisting of the thread. These forces may be conveniently equalized by suitably decreasing the pitch of that helix which produces a force in the opposite direction to that produced by the twist of the thread itself.

For instance, referring to Figure 4, if we assume that, in the first layer $f$ having a fairly steep pitch, the hand of the helix is such as to produce a force in the direction of the arrow $p$ which is also the direction of the force $n$ produced by the tendency of the thread to unwind, the pitch of the helix of opposite hand in the succeeding layer $f'$ must be substantially reduced in order to increase the torque in the direction of the arrow o resulting from the helical winding, since this torque is opposed by the force m resulting from the tendency of the individual thread f' to unwind. In this manner the two forces will be substantially balanced, and there will be no tendency to distort the tube due to expansion or tension by the application of pressure to the interior thereof.

It is preferable to maintain uniform spacing between the threads in all of the layers and to alter the pitch of the threads in successive layers by altering the number of strands wound on. For instance, in the illustrative example shown in Figure 4, it may be assumed that with uniform spacing of threads and uniform pitch in the two layers, the winding of 44 threads f in the first layer would ordinarily necessitate the winding of 48 threads in the second layer by reason of the greater diameter of the second layer. However, by reducing the number of strands f' in the outer layer to 38, the force m, produced by the tendency of the individual strands to untwist, will be reduced, and at the same time the pitch of the helix will be decreased, thereby increasing the force o, so that the torque produced by action of the combined forces will be substantially eliminated. It will thus be appreciated that the liability of disruption of the hose by reason of the application of excessive pressure to the interior thereof or by the direct application of tension thereto may be materially reduced, not only by winding the successive layers in opposite directions, but by altering the pitch of the threads or strands in the manner herein described, due allowance being made for the difference in the distance from the center of the hose at which the forces exerted by each layer of reinforcing strands will act.

It will be apparent that further layers or pairs of layers may be added, care being exercised to counteract the forces in each additional pair of layers of strands by suitably proportioning the pitch of the helices or the number of strands. Such further alterations and modifications of the structure shown and described herein to illustrate the principles of the invention are contemplated as fall within the spirit and scope of the appended claim.

Having thus described the invention, what is claimed as new and desired to be secured by Letters Patent is:

The herein described rubber hose, comprising a tubular body of rubber, a plurality of layers of strands of twisted fiber helically wound thereon, the individual strands in each layer being twisted in the same direction and being spaced from one another, and a layer of rubber intermediate the layers of strands, the strands in one layer being wound in the opposite direction from the strands in the other layer, the pitch of the helically wound strands being greater in the inner layer in which the direction of winding is the same as the direction of twist of the individual strands, the difference in pitch between the two layers being such that the forces tending to twist the hose are substantially balanced.

In testimony whereof I hereunto affix my signature.

HEINRICH PAHL.